(12) United States Patent
Dunn

(10) Patent No.: US 12,043,005 B2
(45) Date of Patent: Jul. 23, 2024

(54) MANDREL SUPPORT SYSTEM AND METHOD

(71) Applicant: LOCKHEED MARTIN CORPORATION, Bethesda, MD (US)

(72) Inventor: Eric Dunn, Trumbull, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 121 days.

(21) Appl. No.: 17/167,493

(22) Filed: Feb. 4, 2021

(65) Prior Publication Data
US 2022/0242069 A1    Aug. 4, 2022

(51) Int. Cl.
| | | |
|---|---|---|
| B29C 70/42 | (2006.01) | |
| B29C 70/54 | (2006.01) | |
| B29K 63/00 | (2006.01) | |
| B29K 67/00 | (2006.01) | |
| B29K 307/04 | (2006.01) | |
| B29K 309/08 | (2006.01) | |
| B29L 31/08 | (2006.01) | |

(52) U.S. Cl.
CPC .............. *B29C 70/54* (2013.01); *B29C 70/42* (2013.01); *B29K 2063/00* (2013.01); *B29K 2067/00* (2013.01); *B29K 2307/04* (2013.01); *B29K 2309/08* (2013.01); *B29L 2031/082* (2013.01)

(58) Field of Classification Search
CPC ................................ B29C 70/54; B29C 70/42
See application file for complete search history.

(56) References Cited

U.S. PATENT DOCUMENTS

| | | | | |
|---|---|---|---|---|
| 2,859,151 A | * | 11/1958 | Usab ..................... | B29C 70/326 425/117 |
| 3,322,585 A | * | 5/1967 | Weber .................... | B29C 70/10 156/174 |
| 3,328,224 A | * | 6/1967 | Aylor ..................... | B29C 70/16 156/461 |
| 3,378,426 A | * | 4/1968 | Medney ................ | B29C 70/504 156/441 |
| 3,666,598 A | * | 5/1972 | Christie et al. ....... | B29C 70/326 156/190 |
| 3,726,751 A | * | 4/1973 | Casadevall ............ | B65H 75/10 428/113 |
| 3,738,637 A | * | 6/1973 | Goldsworthy ....... | B29D 28/005 269/61 |
| 3,788,916 A | * | 1/1974 | Gadelius ............... | B29C 41/042 264/312 |

(Continued)

*Primary Examiner* — Andrew D Graham
(74) *Attorney, Agent, or Firm* — Foley & Lardner LLP

(57) ABSTRACT

A system includes a mandrel having an exterior surface configured to receive composite material, a first end, and a second end opposite the first end, an end support coupled to the first end of the mandrel such that the mandrel is rotatable about an axis of rotation, and an intermediate support configured to support the mandrel between the first end and the second end such that at least a portion of the exterior surface is exposed while the mandrel is supported by the intermediate support, a vertical distance between the intermediate support and the axis of rotation defining a support distance, and the intermediate support being adjustable between a first position having a first support distance and a second position having a second support distance greater than the first support distance.

18 Claims, 5 Drawing Sheets

(56) References Cited

U.S. PATENT DOCUMENTS

| | | | | |
|---|---|---|---|---|
| 4,463,044 A | * | 7/1984 | McKinney | B29C 70/34 |
| | | | | 428/156 |
| 4,504,283 A | * | 3/1985 | Charvat | B29C 39/10 |
| | | | | 451/526 |
| 4,633,632 A | * | 1/1987 | Sarh | B64C 1/12 |
| | | | | 52/84 |
| 4,787,946 A | * | 11/1988 | Romanski | B29C 41/20 |
| | | | | 156/247 |
| 4,992,133 A | * | 2/1991 | Border | B29C 65/3668 |
| | | | | 100/312 |
| 5,225,019 A | * | 7/1993 | Huvey | F16L 11/083 |
| | | | | 156/173 |
| 5,626,707 A | * | 5/1997 | Hadzicki | B29C 53/8016 |
| | | | | 156/190 |
| RE37,242 E | | 6/2001 | Hadzicki et al. | |
| 6,406,580 B1 | * | 6/2002 | Campbell, Jr. | B29C 35/02 |
| | | | | 156/193 |
| 8,603,290 B2 | | 12/2013 | Feeney | |
| 2006/0108058 A1 | * | 5/2006 | Chapman | B64F 5/10 |
| | | | | 156/245 |
| 2008/0078499 A1 | * | 4/2008 | Feeney | B29C 70/44 |
| | | | | 156/367 |
| 2012/0112377 A1 | * | 5/2012 | Bennett | B29C 70/32 |
| | | | | 425/388 |
| 2015/0239181 A1 | * | 8/2015 | Corradini | B65H 23/0328 |
| | | | | 156/64 |
| 2015/0375491 A1 | * | 12/2015 | McDonald | B32B 37/10 |
| | | | | 156/172 |
| 2019/0061281 A1 | * | 2/2019 | Stone | B25J 15/0019 |

* cited by examiner

MANDREL SUPPORT SYSTEM AND METHOD

This invention was made with government support under Contract No. W911W6-19-9-0005 awarded by the U.S. Army. The government has certain rights in the invention.

FIELD

The present disclosure relates generally to systems and methods of manufacturing composite structures. More specifically, the present disclosure relates to a system and method of providing support for a mandrel while composite material is deposited (e.g., laid up) on the mandrel.

BACKGROUND

Tubular composite structures are typically laminated on a mandrel to generate an uncured preform having a particular geometry. The construction of the mandrel assembly affects the resulting structure of the composite and the lamination process.

SUMMARY

At least one embodiment relates to a system to shape a composite material into a composite part, including a mandrel having an exterior surface configured to receive the composite material, a first end, and a second end opposite the first end, an end support coupled to the first end of the mandrel such that the mandrel is rotatable about an axis of rotation, and an intermediate support configured to support the mandrel between the first end and the second end such that at least a portion of the exterior surface at a longitudinal location of the support is exposed while the mandrel is supported by the intermediate support, a vertical distance between the intermediate support and the axis of rotation defining a support distance, and the intermediate support being adjustable between a first position having a first support distance and a second position having a second support distance greater than the first support distance.

Another embodiment relates to a method including providing a mandrel having a first end and a second end opposite the first end, coupling the first end of the mandrel to an end support such that the mandrel may rotate about an axis of rotation, providing an intermediate support configured to support the mandrel between the first end and the second end, wherein a vertical distance between the intermediate support and the axis of rotation defines a support distance, depositing composite material on the mandrel, wherein the composite material has a composite thickness, rotating the mandrel such that the composite material is in contact with the intermediate support, and increasing the support distance of the intermediate support in response to rotating the mandrel.

Another embodiment relates to an apparatus including a base member, a first arm rotatably coupled to the base member, a second arm rotatably coupled to the base member, and a belt coupled to the first arm and the second arm, wherein the belt is configured to support a mandrel, wherein rotating the first arm and the second arm changes a support height defined by a distance between the base member and the belt.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
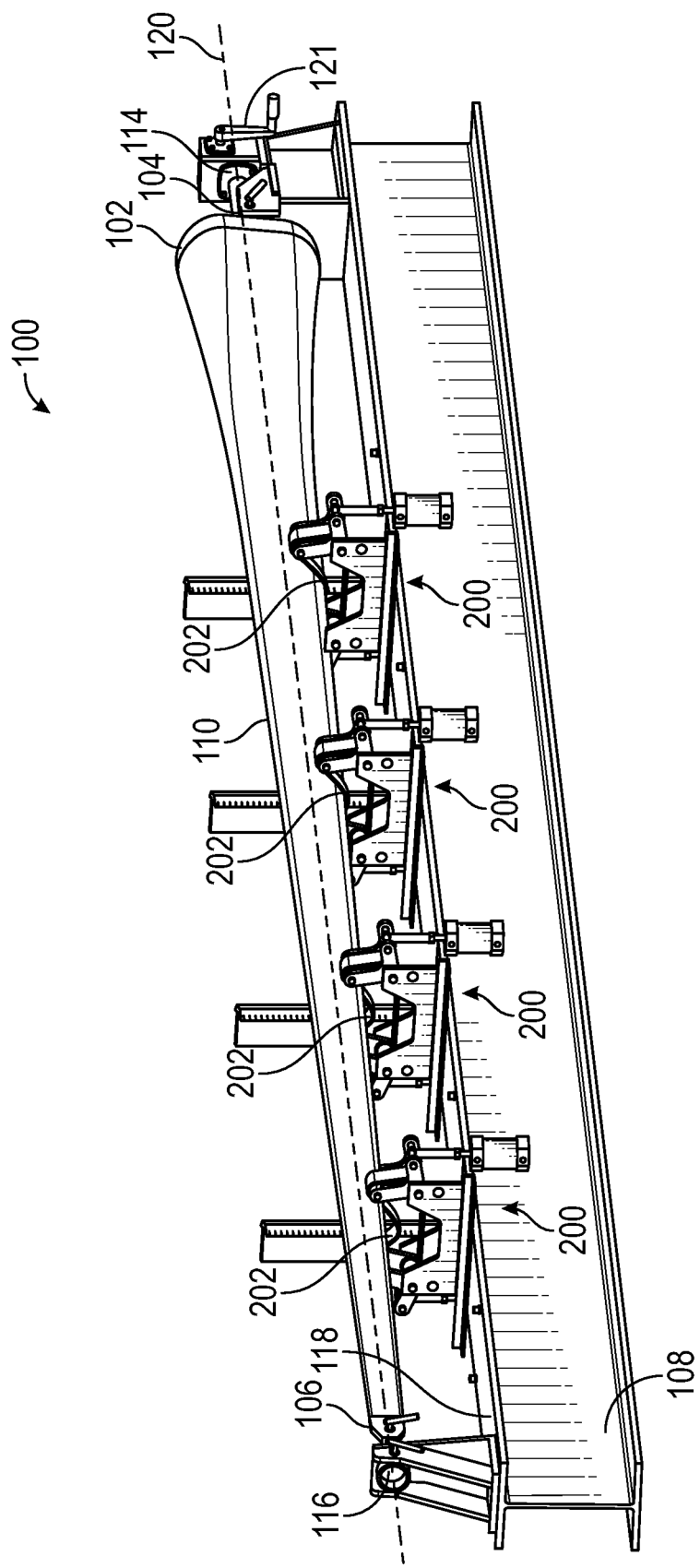
FIG. 1 is a perspective view of a mandrel support system, according to an example embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Composite materials (e.g., carbon fiber, poly-paraphenylene terephthalamide (K29) (e.g. Kevlar®), fiberglass, etc.) may be deposited (e.g., laid up, laminated, or robotically placed) onto a male mandrel as a part of manufacturing tubular composite structures. The mandrel is used as a temporary mold inside the composite structure. A reinforcing material (e.g., fibers or fabric), along with matrix material (e.g., polyester, epoxy resin, etc.), collectively referred to as a composite material, may be deposited onto the mandrel to create an uncured composite structure in the shape of the mandrel. The composite structure may then be cured, thereby solidifying the matrix material. However, before composite structure is cured, the matrix material may be relatively viscous, resulting in an uncured composite structure that may be at risk of ply migration (i.e., undesired relocation of the matrix material and/or the reinforcing material). Ply migration may result in the tubular composite structure having undesirable structural qualities, which may be especially undesirable when producing high performance composite structures, such as relatively thin helicopter blades.

According to various examples, a mandrel may be supported at both ends while material is being deposited (e.g., laid up) onto the mandrel. The mandrel may then be rotated during the depositing process such that material may be deposited around the perimeter of the mandrel. However, by only supporting the mandrel at the ends, the mandrel may deflect (e.g., by sagging) between the two ends. For example, the weight of the mandrel and the composite material deposited onto the mandrel may cause a portion of the mandrel to deflect. The laminating process may also result in such deflections. Mandrel sag may contribute to ply migration and other structural concerns, and therefore, is generally undesirable. Mandrel sag may be mitigated by providing a sufficiently stiff mandrel and using low weight materials to create the mandrel.

However, in some circumstances, using a stiff mandrel and low weight materials may be insufficient to prevent ply migration due to the complex nature design of the mandrel design. For example, a relatively long and slender mandrel (e.g., a mandrel used to produce a spar for a high performance helicopter blade that is relatively thin) may be especially susceptible to mandrel sag. Additionally, static intermediate supports may be provided to prevent mandrel sag. However, the use of static intermediate supports may require the mandrel to be removed from the support system to adjust the static supports or otherwise interrupt the laminating between steps of the assembly. To aid in the manufacturing process, ply location projection systems may be used which rely on indexing features external to the mandrel. However, the effectiveness of ply location projection systems may be limited because the location of the mandrel between the first and second end of the mandrel does not remain fixed relative to the indexing features during the entire assembly process due to deflections of unknown magnitude.

Referring generally to the figures, systems and methods for supporting a mandrel are disclosed according to various embodiments herein. As described herein, a mandrel support system is configured to support a mandrel at one or more intermediate locations (e.g., via intermediate supports) between a first end and a second end of the mandrel. According to various embodiments, composite material (e.g., carbon fiber, Kevlar®, fiberglass, or combinations thereof etc.) may be deposited (e.g., laminated) on the mandrel as a part of manufacturing a tubular composite structure. By providing support at one or more intermediate locations, the deflection of the mandrel (e.g., mandrel sag) may be reduced or practically eliminated, thereby reducing the risk of ply mitigation during the depositing process.

Further, the systems and methods described herein enable the height of the intermediate supports to be dynamically adjusted during the depositing process based on the radial distance from the intermediate support to the axis of rotation (e.g., for mandrels having a non-circular cross section) as well as for variable composite material thickness laminated onto the mandrel while providing unimpeded access to the entire depositing surface of the mandrel at a particular rotation, thereby enabling 360 degree rotation of the mandrel without the need to remove the mandrel, or auxiliary supports to adjust static intermediate supports and allowing continuous lamination in situ during rotation. A non-linear and non-static intermediate support to laminate interface allows for a relatively constant surface area at the interface, thereby reducing variability of the contact pressure exerted on the uncured laminate reducing mark-off (e.g. localized impressions) which has potentially detrimental impact on laminate strength and stiffness properties. By dynamically adjusting the height of the intermediate supports, the first end and the second end of the mandrel may remain in a constant position during the assembly process, which may particularly advantageous when using a fixed indexing reference (e.g., as a part of shadow graph projections and planar laser projections to ensure the mandrel and composite material axis is in the nominal position during the entirety of the assembly process). Further, by eliminating the need to remove the mandrel or intermediate support apparatus at various points, the duration of the assembly process may be reduced.

Referring now to FIG. 1, a mandrel support system 100 is shown according to an example embodiment. The mandrel support system 100 includes a mandrel 102 configured to receive composite material 110 (e.g., as a part of a depositing process). According to various embodiments, the mandrel 102 may be used to produce a spar for a high performance helicopter blade. For example, the mandrel 102 may have an exterior surface that is configured to receive composite material 110. According to various embodiments, the mandrel is generally tubular in shape. A first end 104 of the mandrel 102 is supported by a first end support 114 and a second end 106 of the mandrel 102 is supported by a second end support 116. The first end support 114 and the second end support 116 are coupled to a base member 108 having an upper surface 118. The mandrel 102 is rotatably coupled to the first end support 114 and the second end support 116 such that the mandrel 102 may rotate about an axis of rotation 120 to adjust an angular position of the mandrel 102. According to various embodiments, the angular position of the mandrel 102 may be controlled by using an actuator. As shown, the actuator is a manual actuator, shown as a crank 121, which allows a user of the mandrel support system 100 to rotate the mandrel 102 as desired. Alternatively or additionally, the mandrel support system 100 may include one or more actuators other than a crank 121 to rotate the mandrel 102 as desired. As shown, the second end support 116 passively supports the mandrel 102, however, it should be appreciated that an actuator may be coupled to the second end support 116 as well as the first end support 114. According to various embodiments, the actuator(s) coupled to the first end support 114 and/or the second end support 116 may be powered actuators (e.g., servo motors) that are configured to cause the mandrel 102 to rotate as is discussed further below with respect to FIGS. 6 and 7.

The mandrel support system 100 further includes a plurality of intermediate supports 200. It should be appreciated that, while the example mandrel support system 100 includes four intermediate supports 200, other mandrel support systems may include a different number of intermediate supports 200 (e.g., one, two, three, five, etc.) according to various embodiments. Each intermediate support 200 includes a support member, shown as a belt 202, configured to support the mandrel 102. The intermediate supports 200 are coupled to the base member 108, such that the intermediate supports 200 may support the mandrel 102 between the first end 104 and the second end 106 of the mandrel. As is discussed further below with respect to FIGS. 2-5, the support height (e.g., the vertical distance between the upper surface 118 of the base member 108 and the point of contact on the belt 202) may be adjusted based on the angular position of the mandrel 102 as well as for variable composite material thickness deposited onto the mandrel 102.

Figure 2:
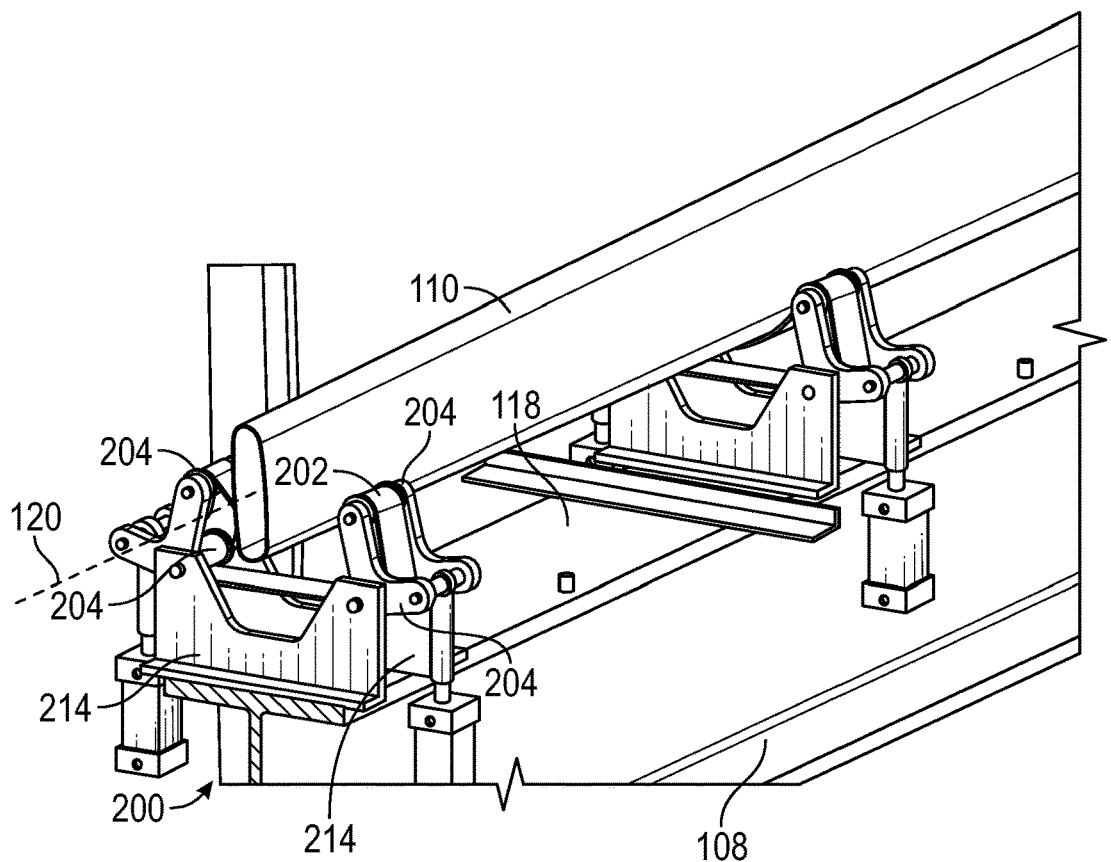
FIG. 2 is a perspective view of an intermediate support in a first position, according to an example embodiment.
Figure 3:
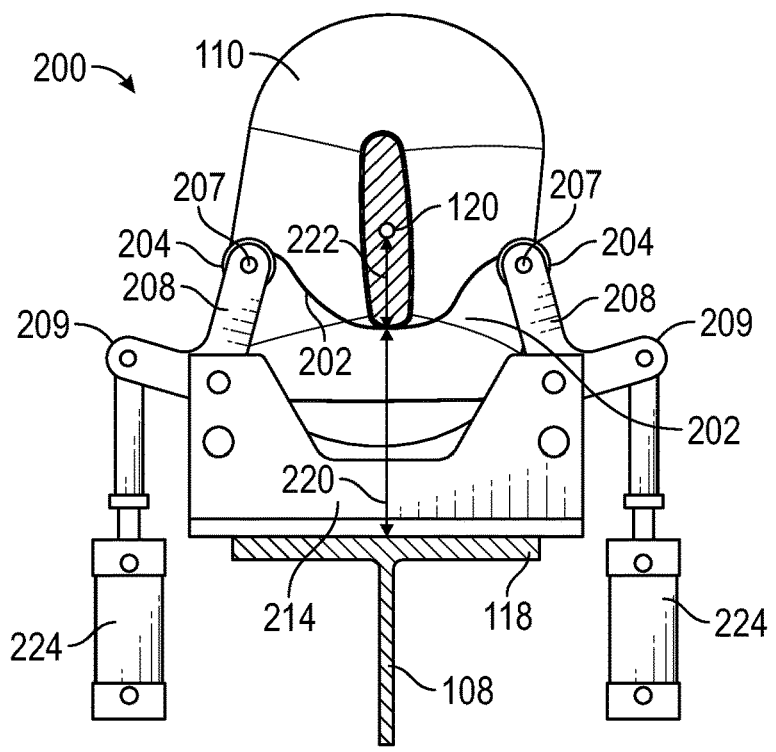
FIG. 3 is a perspective view of the intermediate support of FIG. 2, according to an example embodiment.
Figure 4:
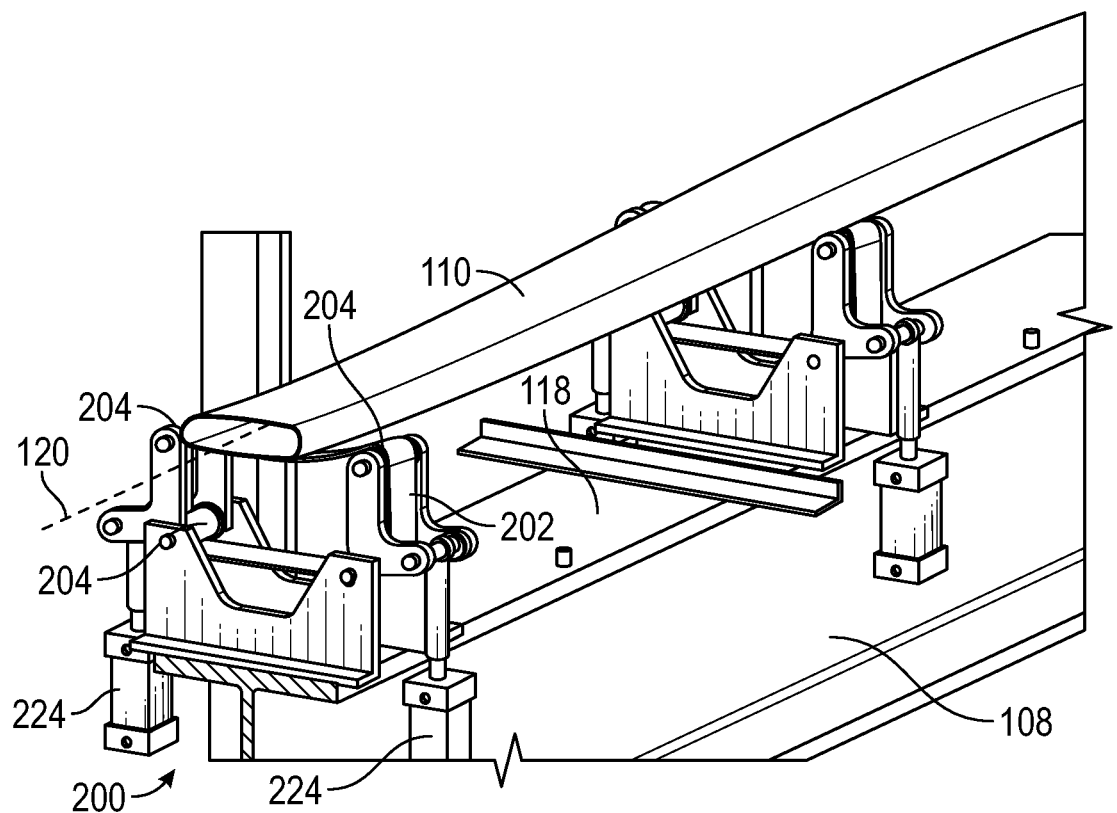
FIG. 4 is a perspective view of an intermediate support in a second position, according to an example embodiment.
Figure 5:
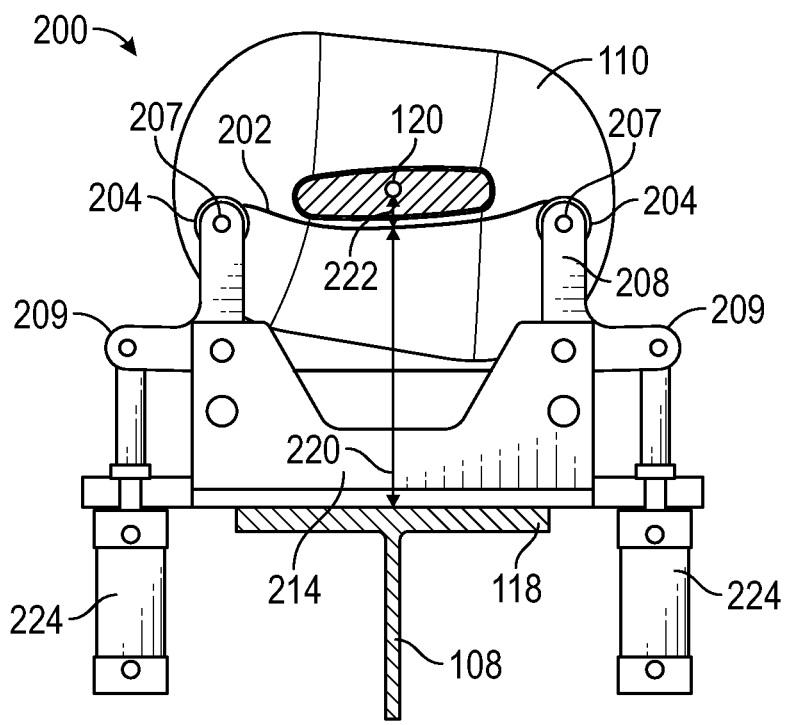
FIG. 5 is a perspective view of the intermediate support of FIG. 4, according to an example embodiment.

Referring now to FIGS. 2-5, an intermediate support 200 is shown according to an example embodiment. The intermediate support 200 is configured to support the mandrel 102 between the first end 104 and the second end 106. The intermediate support 200 is configured to be adjustable between at least a first position, as shown in FIGS. 2 and 3, and a second position, as shown in FIGS. 4 and 5. It should be appreciated that the mandrel 102 is not shown in FIGS. 2-5, and instead the deposited composite material 110 is shown for illustrative purposes.

The intermediate support 200 includes a belt 202 configured to support the mandrel 102 between the first end 104 and the second end 106 of the mandrel. Before composite material 110 is deposited onto the mandrel 102, the belt 202 may be in direct contact with the mandrel 102 and as composite material 110 is deposited onto the mandrel 102, the belt 202 may contact the composite material 110 while supporting the mandrel 102. The belt 202 is configured to deflect (e.g., bend) under the weight of the mandrel 102 such that a portion of the belt 202 conforms to the portion of the mandrel 102 or the composite material 110. For example, some or all of the portion of the belt 202 that is in contact with the mandrel 102 or composite material 110 may follow the contour of the mandrel 102 or the composite material 110.

According to various embodiments, the belt 202 may have a relatively high longitudinal stiffness. In other words, while the belt 202 may bend in a vertical direction, the belt 202 may not substantially stretch (e.g., stretching no more than between about 1% to about 2%, or no more than between about 2% to about 5% of the overall length of the belt) in the horizontal direction under the weight of the mandrel 102, and therefore, the length of the belt 202 will substantially remain the same while the belt 202 is being used to support the mandrel 102. According to various embodiments, the belt 202 is manufactured with reinforcing nylon fibers.

According to various embodiments, the belt 202 may also include or be coated in a non-stick material, such as silicone, polytetrafluoroethylene, etc. such that the mandrel 102 slips on top of the belt 202 as the mandrel 102 is rotated. Alternatively or additionally, the intermediate support 200 may include a plurality of rollers 204 that the belt 202 wraps around such that the belt 202 will rotate about the axis of rotation of each roller 204 as the mandrel 102 is rotated if the belt 202 adheres to the mandrel 102 or the composite material 110 deposited onto the mandrel 102. Driven belts 202 which contribute to or solely provide rotational force on the mandrel 102 about the axis of rotation 120 are also contemplated herein.

The intermediate support 200 also includes a first arm 208 and a second arm 208. The arms 208 are configured to selectively adjust a support height 220 (e.g., the vertical distance between the upper surface 118 of the base member 108 and the point of contact on the belt 202) and a support distance 222 (e.g., the vertical distance between the axis of rotation 120 and the point of contact on the belt 202). As shown, the arms 208 are generally "L" shaped, however, it should be appreciated that the intermediate support 200 may include arms having a different shape. As shown, the arms 208 are rotatably coupled to two plates 214 such that a first end 207 and a second end 209 of each arm may rotate about the plates 214. According to various embodiments, the intermediate support 200 may further include one or more actuators 224 (e.g., a pneumatic cylinder, servo motor, etc.) configured to adjust the support distance 222 of the intermediate support 200. For example, the actuator 224 may provide an upward force on the first arm 208 and the second end 209, thereby causing the first end 207 of the first arm 208 to rotate closer towards the second arm 208, thereby increasing the support distance 222 and reducing the support height 220 while increasing the contact surface area by increasing the arc length between resulting contact tangency points between the composite material 110 and belt 202. Additionally, applying an upward force on the first arm 208 and the second arm 209 will adjust a roller height (e.g., the vertical distance between the roller 204 coupled to the first end 207 of each arm 208 and the upper surface 118 of the base member 208) of the intermediate support 200. As shown, each arm 208 is coupled to a different actuator 224, however, it should be appreciated that a single actuator may be coupled to both arms 208 such that a single actuator 224 may be utilized to adjust the support distance 222 and the support height 220. Further, according to various embodiments, the arms 208 may be coupled to a manual actuator 224 (e.g., a crank) such that the support distance 222 may be controlled by a user of the mandrel support system 100.

It should be appreciated that, while the belt 202 is a closed-loop belt, according to various embodiments, the belt 202 may include a strip of material fixed to the first arm 208 and the second arm 208. For example, the belt 202 may be an open loop that is fixed to the first end 207 of each arm 208. In this example embodiment, the belt 202 may not rotate about the rollers 204 while the mandrel 102 is rotated, and instead, the mandrel 102 may slip along the belt 202.

Figure 6:
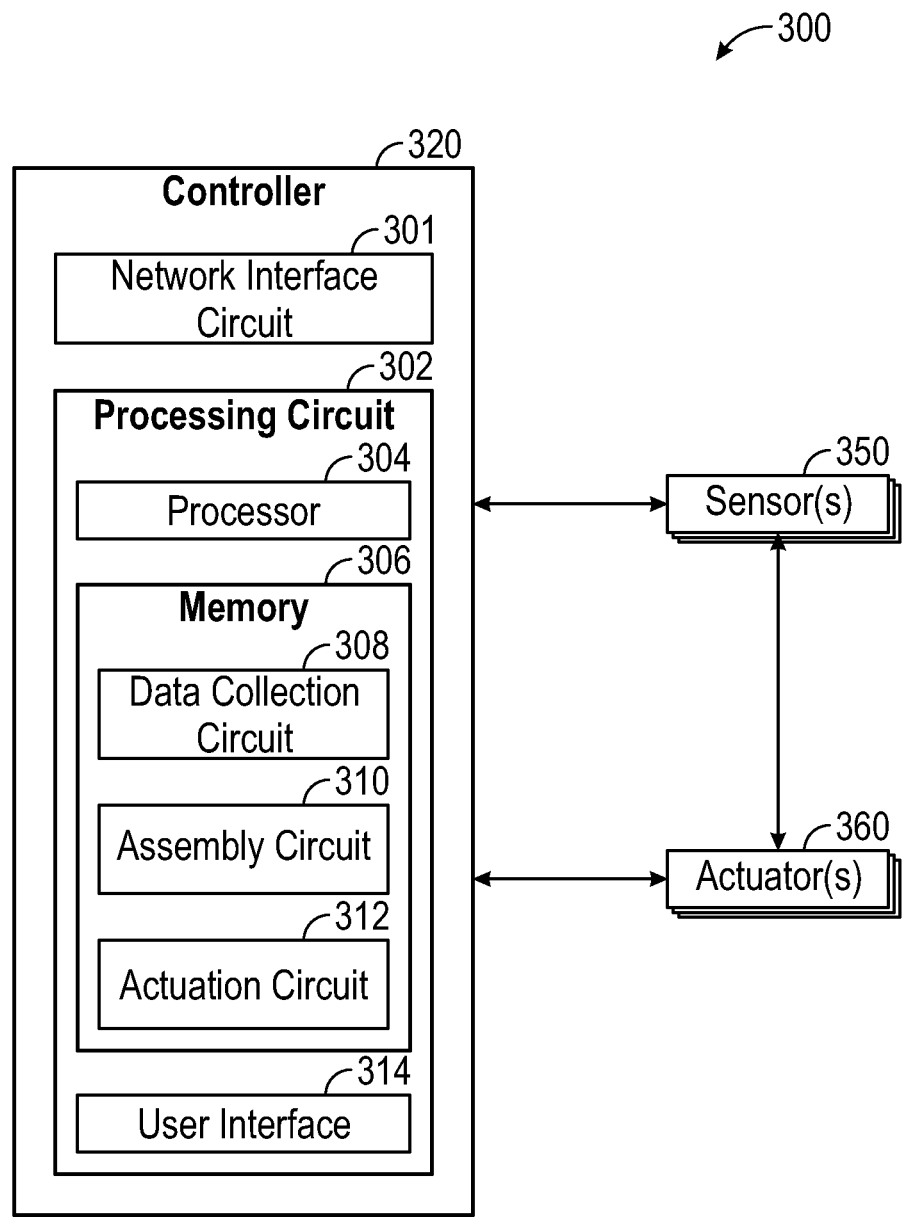
FIG. 6 is a schematic view of a mandrel support controller, according to an example embodiment.

Referring now to FIG. 6, a schematic view of a mandrel support controller system 300 is shown according to an example embodiment. The mandrel support controller system 300 may read numeric control programs which prescribe the motion of the actuators 360 based on algorithms defined by the mandrel support system 100 kinematics, mandrel 102 surface geometry, and composite material 110 composition. For example, the mandrel support controller system 300 may be included in the mandrel support system 100. The mandrel support controller system 300 includes a mandrel support controller 320. The mandrel support controller 320 may be configured to control the angular position of the mandrel 102 and the support distance 222 of one or more intermediate supports 200 (e.g., by causing actuator(s) 360 to actuate). The actuator(s) 360 may be configured to adjust the angular position of the mandrel 102 (e.g., by causing the mandrel 102 to rotate) and adjust the support height 220 of one or more intermediate support 200 (e.g., by applying a force to the arms 208). It should be appreciated that the actuators 360 may include the actuators 224. Further, the actuators 360 may be any type of actuator including a pneumatic cylinder, a servo motor, etc.

The mandrel support controller system 300 includes one or more sensors 350 configured to record data associated with the mandrel support system 100. For example, the data received from the one or more sensors 350 may be utilized by the mandrel support controller 320 to determine an angular position of the mandrel 102, the thickness of the deposited composite material 110, the support height 220 of each intermediate support 200, the axis of rotation 120, etc. The sensor(s) 350 may include any type of sensor that may record data corresponding to the mandrel support system 100, including at least one position sensor, at least one distance sensor, at least one weight sensor, at least one pressure sensor, at least one voltage detector, etc. and any combination thereof. In particular, a sensor suite of the sensors 350 in at least one embodiment may include a distance sensor disposed on the upper surface 118 of the base member 108, a distance sensor positioned above mandrel 102, a voltage sensor coupled to one or more of the actuators 360, a pressure sensor disposed on the intermediate support 200, a pressure sensor disposed on one or more of the end supports 114, 116, a position sensor disposed on one or more of the end supports 114, 116, a position sensor disposed on the crank 121, etc.

In various embodiments, the mandrel support controller 320 is communicably coupled to sensor(s) 350, such that the data recorded by the sensor(s) 350 may be saved and analyzed. In certain embodiments, the mandrel support controller 320 includes a network interface circuit 301 configured to enable the mandrel support controller 320 to exchange information over a network. The network interface circuit 301 can include program logic that facilitates connection of the mandrel support controller 320 to the network (e.g., a cellular network, Wi-Fi, Bluetooth, radio, etc.). The network interface circuit 301 can support communications between the mandrel support controller 320 and other systems, such as a composite layup system (e.g., an automated fiber placement machine) configured to deposit the composite material 110 onto the mandrel 102 or a ply location projection system that utilizes indexing features external to the mandrel 102 and the composite material 110 deposited onto the mandrel 102. For example, the network interface circuit 301 can include a modem, a Bluetooth transceiver, a radio-frequency identification (RFID) transceiver, or a near-field communication (NFC) transmitter or any combination thereof. In some embodiments, the network interface circuit 301 includes hardware and machine-readable media sufficient to support communication over one or more channels of data communication.

The mandrel support controller 320 is shown to include a processing circuit 302 and a user interface 314. The processing circuit 302 may include a processor 304 and a memory 306. The processor 304 may be coupled to the memory 306. The processor 304 may include, for example, an application specific integrated circuit (ASIC), one or more field programmable gate arrays (FPGAs), a group of processing components, or other suitable processing components. The processor 304 is configured to execute computer code or instructions stored in the memory 306 or received from other computer readable media or sources (e.g., cloud storage, other network storage, a remote server, etc.).

The memory 306 may include one or more devices (e.g., memory units, memory devices, storage devices, etc.) for storing data and/or computer code for completing and/or facilitating the various processes described in the present disclosure. The memory 306 may include random access memory (RAM), read-only memory (ROM), hard drive storage, temporary storage, non-volatile memory, flash memory, optical memory, or any other suitable memory for storing software objects and/or computer instructions. The memory 306 may include database components, object code components, script components, or any other type of information structure for supporting the various activities and information structures described in the present disclosure. The memory 306 may be communicably connected to the processor 304 via processing circuit 302 and may include computer code for executing (e.g., by the processor 304) one or more of the processes described herein.

The data collection circuit 308 is configured to collect and store data collected by the sensor(s) 350. For example, the data collection circuit 308 may collect data during operation of the mandrel support system 100, and store the data. Further, the data collection circuit 308 is configured to store operating parameters that the mandrel support controller 320 may provide to actuators 360 to control the actuators 360. For example, the mandrel support controller 320 may provide operating parameters to one or more actuators 360 to control the support height 220 of one or more intermediate support 200.

The assembly circuit 310 is configured to store assembly instructions (e.g., instructions to manufacture a helicopter blade or a portion thereof) and determine the current status of the assembly. For example, the assembly circuit 310 may cause the user interface 314 to present assembly instructions to an operator of the mandrel support system 100. The user may then utilize the user interface 314 to provide feedback to the assembly circuit 310, such that the assembly circuit 310 may determine the current status of the assembly. For example, after a first layer of composite material 110 is deposited onto the mandrel 102, the user may indicate that the first layer has been deposited using the user interface 314.

Alternatively or additionally, the assembly circuit 310 may determine the current status of the assembly based on signals received from the sensor(s) 350. For example, one or more distance sensor(s) 350 may be positioned about the mandrel 102 such that the sensor(s) 350 may provide data to the mandrel support controller 320 such that the mandrel support controller 320 may determine a composite thickness of the composite material 110 deposited onto the mandrel 102. The assembly circuit 310 may then compare the composite thickness to expected composite thicknesses stored in the assembly instructions to determine the current status of the assembly. Further, one or more weight sensors 350 may provide signals to the mandrel support controller to determine a cumulative weight of the mandrel 102 and the composite material 110. Further, one or more voltage sensors 350 may be coupled to one or more of the actuators 224, such that the mandrel support controller 320 may determine the cumulative weight of the mandrel 102 and the composite material 110 based on the voltage supplied to the actuators 224. The assembly circuit 310 may then compare the cumulative weight to expected cumulative weights in the assembly instructions to determine the current status of the assembly.

The actuation circuit 312 is configured to cause one or more actuators to actuate in response to receiving an indication of the current status of the assembly. For example, if the assembly circuit 310 determines that a first layer of composite material 110 has been deposited and the next step in the assembly is to rotate the mandrel 102, the detection circuit may provide an indication of this state to the actuation circuit 312 such that the actuation circuit 312 may cause an actuator to rotate the mandrel 102.

The user interface 314 is configured to present information to and receive information from a user. In some embodiments, user interface 314 includes a display device (e.g., a monitor, a touchscreen, etc.). In some embodiments, user interface 314 includes an audio device (e.g., a microphone, a speaker, etc.). In various embodiments, user interface 314 receives alerts from actuation circuit 312 and presents the alerts to an operator of the mandrel support system 100. For example, user interface 314 may receive a visual alert from actuation circuit 312 and display a graphic on a display device to alert an operator of the current status of the assembly.

Figure 7:
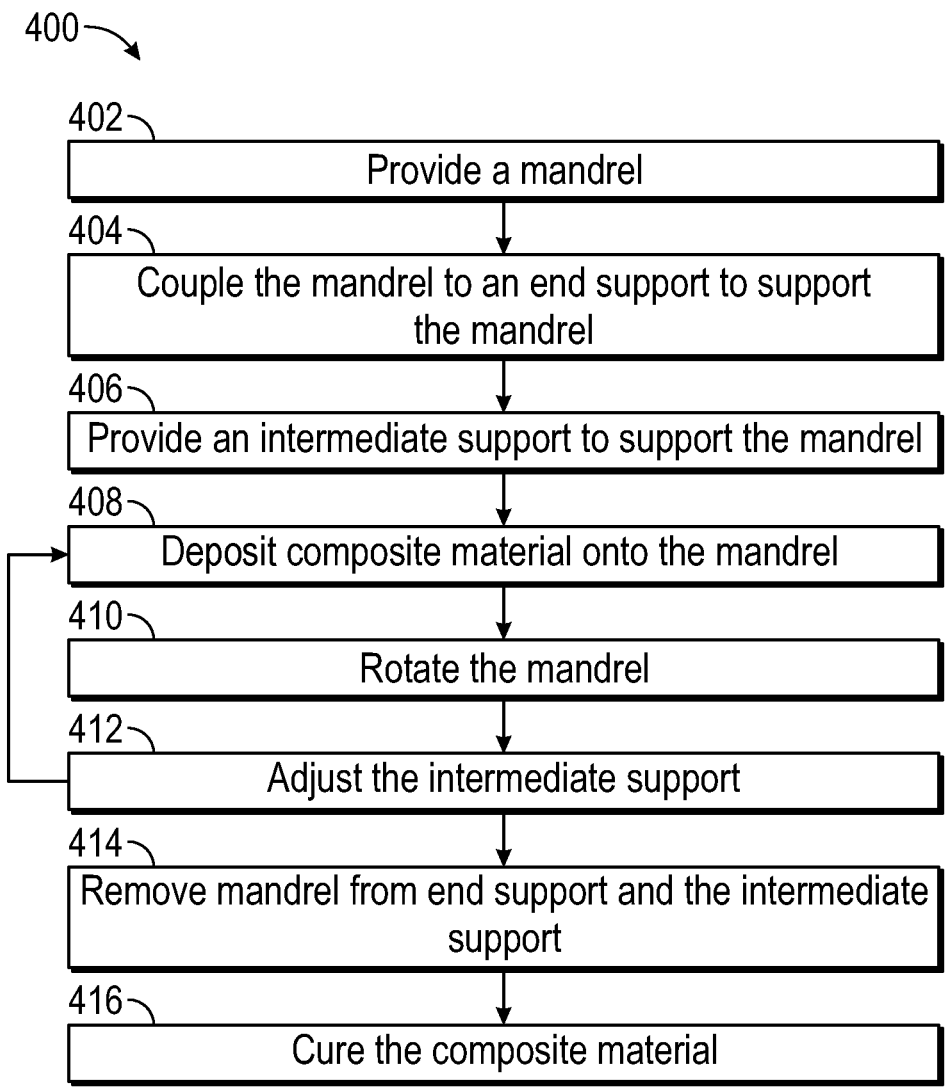
FIG. 7 is a flow diagram of a mandrel support process, according to an example embodiment.

Referring now to FIG. 7, a flow diagram of a composite material manufacturing process 400 is shown according to an example embodiment. The composite material manufacturing process 400 may be used as a part of manufacturing a tubular composite structure (e.g., a spar for a high performance helicopter blade). For example, the composite material manufacturing process 400 may be implemented by the mandrel support system 100 and/or the mandrel support controller system 300. For example, the composite material manufacturing process 400 may be a partially or completely autonomous process. It should be appreciated that in various embodiments, the composite material manufacturing process 400 involves a user operating the mandrel support system 100.

At process 402, a mandrel is provided. For example, the mandrel 102 of the mandrel support system 100 may be provided. At process 404, the mandrel is coupled to an end support. For example, the mandrel 102 may be coupled to the first end support 114 and/or the second end support 116 of the mandrel support system 100. The end support(s) 114, 116 may be rotatably coupled to the mandrel 102 such that the mandrel 102 may rotate 260 degrees about the axis of rotation 120. According to various embodiments, the first end support 114 may be coupled to an actuator 360 configured to cause the mandrel 102 to rotate and the second end support 116 may passively allow the mandrel 102 to rotate. In alternative embodiments, the first end support 114 and the second end support 116 may both be coupled to an actuator 360, such that the mandrel 102 may be driven from both ends 104, 106, which may be particularly advantageous if a mandrel 102 is susceptible to torsional deflection while being rotated.

At process 406, an intermediate support is provided to support the mandrel. For example, the intermediate support 200 of the mandrel support system 100 may be provided to support the mandrel 102. As is discussed above, the support height 220 may be dynamically adjusted based on the angular position of the mandrel 102 and the composite thickness of the composite material 110. According to various embodiments, process 406 includes providing multiple intermediate supports 200. It should be appreciated that the intermediate supports 200 may be equally spaced from one another or variably spaced. For example, if a portion of the mandrel 102 is especially susceptible to deflecting (e.g., due to a relatively low circumference of the mandrel 102 at a specific location) a higher density (i.e., the number of intermediate supports 200 per length of the mandrel 102) of intermediate supports 200 may be utilized in that portion to prevent ply migration.

At process 408, composite material is deposited onto the mandrel. For example, the composite material 110 may be deposited onto the mandrel 102. According to various embodiments, the composite material 110 may be manually deposited by a user of the mandrel support system 100. During the manual deposit of the composite material, shadow graphs may be used in conjunction with a planar laser projector to ensure the mandrel 102 and composite material 110 neutral axis is in the nominal position, which is may be advantageous when using a laser projection system for ply alignment. Additionally or alternatively, the composite material may be deposited by an automated composite deposit system configured to deposit the composite material 110. Additionally, the composite material 110 may be deposited as a part of an automated process.

According to various embodiments, process 408 may include a wet deposit process (e.g., the reinforcing material and the matrix material are separately deposited onto the mandrel 102), as opposed to using pre-impregnated reinforcing materials. For example, process 408 may include applying (e.g., painting, spraying, etc.) uncured matrix material onto the reinforcing material. According to various embodiments, the belt 202 may only surround a portion of the mandrel 102, and opposed to completely surrounding the mandrel 102, such that the matrix material may be applied to the external surface of the mandrel 102 and/or the reinforcing material deposited onto the mandrel 102. In other words, a portion of the exterior surface of the mandrel 102 and/or the reinforcing material deposited onto the mandrel 102 is exposed when the intermediate support 200 engages the mandrel 102, thereby allowing matrix material to be applied to the external surface of the mandrel 102. According to various embodiments, more than half of the exterior surface of the mandrel 102 is exposed while the intermediate support 200 engages the mandrel 102.

At process 410 the mandrel is rotated. For example, the mandrel 102 may be rotated by a user using the crank 121. Additionally or alternatively, an actuator 360 may cause the mandrel 102 to rotate. For example, a user may utilize the user interface 314 to submit signals to the actuator 360 to cause the mandrel 102 to rotate. Additionally, the actuator 360 may be rotated as a part of an automated process.

At process 412, the intermediate support is adjusted. For example, the support height 220 of each intermediate support 200 may be individually adjusted. The support height 220 may be adjusted based on the current status of the assembly, the angular position of the mandrel 102 and/or the composite thickness of the composite material 110. Additionally, the support height 220 may be adjusted as a part of an automated process. Following process 412, the composite material manufacturing process 400 may return to process 408, and additional composite material 110 may be deposited onto the mandrel 102.

According to various embodiment, process 410 and process 412 may be performed simultaneously. In other words, the support height 220 may be dynamically adjusted (i.e., among a plurality of heights) as the mandrel 102 is rotated. In further embodiments, processes 408, 410, 412, may be performed simultaneously. For example, a composite deposit system may deposit composite material 110 on the mandrel while the mandrel 102 is rotated and the intermediate supports 200 are dynamically adjusted based on the angular position of the mandrel and the composite thickness of the composite material 110. For example, the mandrel support controller 320 may control the angular position of the mandrel 102 and the support height 220 of each intermediate support 200. By dynamically adjusting the support height 220 of the intermediate supports 220, the mandrel support system 100 enables continuous lamination in situ during preform (e.g., the composite material 110 deposited onto the mandrel 102) rotation allowing for automated fiber placement. According to various embodiments, continuous lamination in situ during preform rotation may enable the composite material manufacturing process 400 to be partially or entirely automated.

At process 414, the mandrel is removed from the end support and the intermediate support. For example, the mandrel 102 may be removed from the end supports 114, 116 and the intermediate supports 200. According to various embodiments, the first end support 114 and the second end support 116 may include a detaching feature (e.g., a latch, a pin, etc.) configured to uncouple the end supports 114, 116 from the mandrel support system 100. At process 416, the composite material deposited onto the mandrel is cured. For example, the mandrel 102 and the composite material 110 deposited onto the mandrel 102 may be placed in a curing oven, such that the composite material may be cured.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein. For example, in at least one embodiment, the processes shown and described with respect to FIG. 7 may be used to form a structure or portion thereof from a material other than a composite material, e.g., from aluminum material. Other modifications are contemplated without departing from the scope and spirit of the present disclosure.

What is claimed is:

1. A system to shape a composite material into a composite part, comprising:
   a mandrel having an exterior surface configured to receive the composite material, a first end, and a second end opposite the first end;
   an end support coupled to the first end of the mandrel such that the mandrel is rotatable about an axis of rotation;
   a first intermediate support including a first belt configured to contact the mandrel between the first end and the second end;
   a second intermediate support including a second belt spaced apart from the first belt and configured to contact the mandrel between the first intermediate support and the end support such that at least a portion the mandrel is apart from the first intermediate support or the second intermediate support between the first intermediate support and the second intermediate support, a vertical distance between the first intermediate support and the axis of rotation defining a support distance, and the first intermediate support being adjustable between a first position having a first support distance and a second position having a second support distance greater than the first support distance;
   a first actuator configured to adjust the support distance of the first intermediate support;
   a rotational sensor configured to determine an angular position of the mandrel; and a controller communicably coupled to the rotational sensor and the first actuator, the controller configured to actuate the first actuator to adjust the support distance based on at least the angular position of the mandrel.

2. The system of claim 1, wherein the first belt is configured to bend such that a portion of the belt conforms to a portion of the mandrel.

3. The system of claim 1, wherein the first intermediate support comprises a first arm and a second arm, wherein the support distance is adjustable by adjusting a horizontal distance between the first arm and the second arm.

4. The system of claim 3, wherein the first belt comprises a closed loop belt spanning from the first arm and the second arm, such that the mandrel is supported by the closed loop belt.

5. The system of claim 4, wherein the first intermediate support further comprises a first roller coupled to the first arm and a second roller coupled to the second arm, wherein the closed loop belt is configured to rotate about the first roller and the second roller.

6. The system of claim 3, wherein the first actuator is coupled to the first arm and the system further comprises a second actuator coupled to the second arm, wherein the first actuator and the second actuator are configured to adjust the horizontal distance between the first arm and the second arm.

7. The system of claim 6, wherein the first actuator comprises a pneumatic cylinder.

8. The system of claim 6, further comprising:
at least one deposit sensor configured to measure a deposit thickness defined by a thickness of the composite material coupled to the mandrel;
wherein the controller is further configured to actuate the first actuator and the second actuator to adjust the support distance based on the deposit thickness.

9. A method, comprising:
providing a mandrel having a first end and a second end opposite the first end;
coupling the first end of the mandrel to an end support such that the mandrel is rotatable about an axis of rotation;
providing a first intermediate support including a first belt configured to contact the mandrel between the first end and the second end;
providing a second intermediate support including a second belt spaced apart from the first belt and configured to contact the mandrel between the first intermediate support and the end support such that at least a portion of the mandrel is apart from the first intermediate support or the second intermediate support between the first intermediate support and the second intermediate support, wherein a vertical distance between the first intermediate support and the axis of rotation defines a support distance;
depositing a composite material on the mandrel, wherein the composite material has a composite thickness, the mandrel having an exterior surface configured to receive the composite material;
determining, by a rotational sensor, an angular position of the mandrel;
rotating the mandrel such that the composite material is in contact with the first intermediate support; and
actuating, by a controller, a first actuator, and adjusting, by the first actuator, the support distance of the first intermediate support in response to rotating the mandrel, wherein the support distance is adjusted based on at least the angular position of the mandrel.

10. The method of claim 9, wherein the first intermediate support comprises a first arm and a second arm, wherein adjusting the support distance comprises increasing a horizontal distance between the first arm and the second arm.

11. The method of claim 10, wherein the first belt comprises a closed loop belt spanning from the first arm and the second arm, such that the mandrel is supported by the closed loop belt.

12. The method of claim 11, wherein the first intermediate support further comprises a first roller coupled to the first arm and a second roller coupled to the second arm, wherein rotating the mandrel causes the closed loop belt to rotate about the first roller and the second roller.

13. The method of claim 10, wherein adjusting the support distance comprises:
exerting, on the first arm, a first force by the first actuator coupled to the first arm; and
exerting, on the second arm, a second force by a second actuator coupled to the second arm.

14. The method of claim 13, wherein the first actuator is a servo motor configured to be controlled by the controller based on the composite thickness, wherein the controller is configured to determine the composite thickness based on data received from at least one sensor.

15. The method of claim 14, wherein the at least one sensor comprises at least one distance sensor configured to measure the composite thickness and.

16. The system of claim 3, wherein the second intermediate support comprises a third arm and a fourth arm, wherein the support distance proximate the second intermediate support is adjustable by adjusting a horizontal distance between the third arm and the fourth arm.

17. The system of claim 16, wherein the first arm and the second arm are adjustable independently from the third arm and the fourth arm.

18. The system of claim 16, wherein the first arm and the second arm are spaced apart from the third arm and the fourth arm.

* * * * *